No. 610,446. Patented Sept. 6, 1898.
J. R. HORN.
NUT LOCK.
(Application filed Jan. 18, 1898.)
(No Model.)
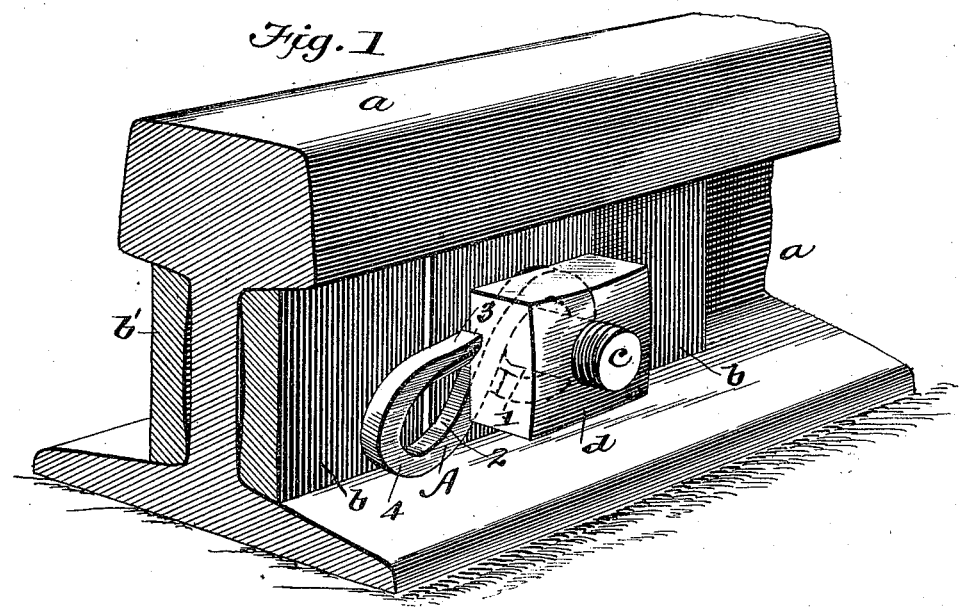
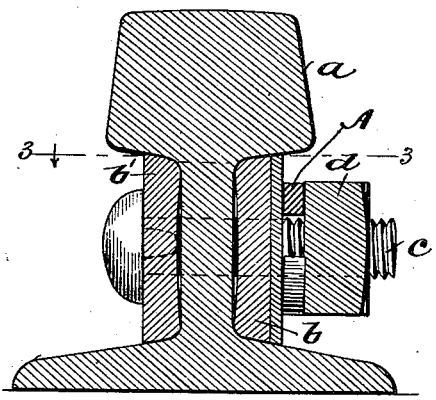
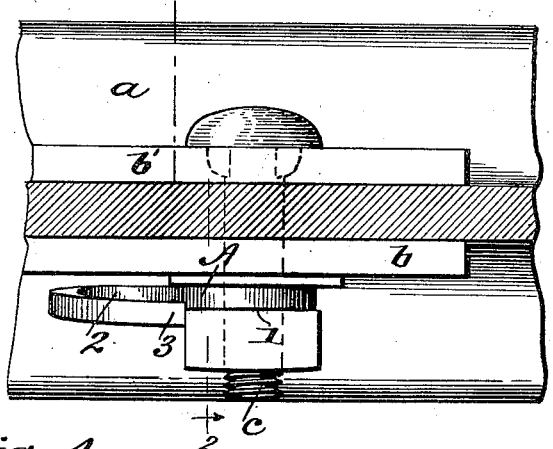
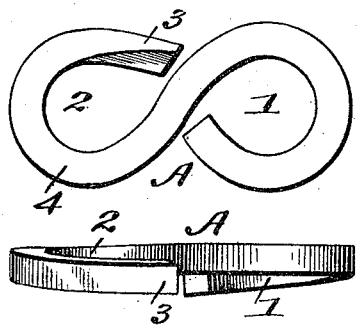
WITNESSES:
M. D. Blondel.
Amos W. Hart.
INVENTOR
John R. Horn.
BY Munn & Co.
ATTORNEYS.

UNITED STATES PATENT OFFICE.

JOHN R. HORN, OF CAMDEN, ARKANSAS.

NUT-LOCK.

SPECIFICATION forming part of Letters Patent No. 610,446, dated September 6, 1898.

Application filed January 18, 1898. Serial No. 667,038. (No model.)

*To all whom it may concern:*

Be it known that I, JOHN R. HORN, of Camden, in the county of Ouachita and State of Arkansas, have invented a new and useful Improvement in Nut-Locks, of which the following is a specification.

The chief desiderata of a nut-locking device are that it shall automatically take up the slack caused by wear of the angle or fish plates and bolts and that it shall positively lock the nut or absolutely prevent backward rotation of the same when in use and shall, notwithstanding, be adapted to allow easy application and removal of the nut.

To these ends I have devised and practically applied the invention hereinafter described, reference being had to the accompanying drawings, in which—

Figure 1 is a perspective view showing my invention applied to a railroad-rail joint. Fig. 2 is a vertical cross-section on line 2 2 of Fig. 3. Fig. 3 is a horizontal section on line 3 3 of Fig. 2. Fig. 4 includes three views of the nut-locking device.

$a$ indicates a railroad-rail, $b$ $b'$ the angle or fish plates applied to the meeting ends or joints of such rails, and $c$ and $d$ a screw-bolt and nut, respectively, for securing the aforesaid parts together.

My improved spring nut-locking device A is shown applied to the bolt $c$ between the nut $d$ and the adjacent fish-plate $b$. The device is constructed of a steel bar properly tempered and having approximately the form of the capital letter S, or more nearly that of the numeral 8, save that the ends of the bar are free and both bent spirally outward from the face of the body of the device. The bolt $c$ passes through one of the loops 1 of the device A, and the other loop 2 lies normally in the space between the head of the rail $a$ and the base-flange or shoulder of the fish-plate $b$. The end portion of the bolt-loop 1, which, as before stated, is bent spirally outward, engages at its upper corner or angle the under side of the nut $d$. In brief, this portion of the locking device forms a strong spring, which, acting between the opposite surfaces of the fish-plates and nut, serves to take up any slack due to wear and holds both the fish-plates and the rail firmly together under all circumstances—a function of the greatest practical importance.

The outer end portion 3 of the loop 2 of the locking device A is curved spirally upward to adapt its extremity to engage the side of the nut $d$ when the latter is screwed down to its proper position. Thus such end portion 3 is a positive lock for the nut, absolutely preventing its backward rotation. The part 3 is also beveled on the lower side, as shown best in Fig. 1, for the purpose of enabling the nut $d$ to pass over it when being screwed on. It will be observed, however, that the position and relation of this end portion 3 to the nut $d$ are such that a wrench may be applied to the latter without obstruction for screwing it on or off the bolt.

It is apparent that the nut may be screwed off by flattening the bent-up locking end of the device A, holding it pressed inward below the plane of the nut.

It will be seen that the loop 4 of the device A is thrown down into contact with the shoulder of the angle or fish plate when the nut $d$ tends to rotate backward, and thus further movement of both the nut and device A is prevented.

In practice I may apply a square flat metal washer between the device A and the fish-plate for the purpose of furnishing an increased bearing for said device on the fish-plate.

What I claim is—

1. As an improved article of manufacture, the spring nut-locking device consisting of a steel bar or rod having approximately the form of the numeral 8, but its ends being both free and bent outward from the plane of the body portion of such device, and one of said ends being beveled on its inner side, as and for the purpose specified.

2. The combination, with a railroad-rail, angle or fish plate, and a bolt and nut for holding such parts together, of the spring locking device, having substantially the shape of the numeral 8, one loop embracing the bolt, and its free end projecting and bearing outward against the nut, while the other loop rests on the fish-plate shoulder and its free end projects outward and engages the side of the bolt, as and for the purpose specified.

JOHN R. HORN.

Witnesses:
D. W. CHANDLER,
CHAS. G. POPE.